US012560189B2

(12) United States Patent (10) Patent No.: US 12,560,189 B2
Fujiwara et al. (45) Date of Patent: Feb. 24, 2026

(54) JOINT STRUCTURE

(71) Applicant: Panasonic Intellectual Property Management Co., Ltd., Osaka (JP)

(72) Inventors: Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 620 days.

(21) Appl. No.: 17/671,841

(22) Filed: Feb. 15, 2022

(65) Prior Publication Data

US 2022/0170494 A1 Jun. 2, 2022

Related U.S. Application Data

(63) Continuation of application No. PCT/JP2020/032641, filed on Aug. 28, 2020.

(30) Foreign Application Priority Data

Sep. 5, 2019 (JP) ................................. 2019-162386

(51) Int. Cl.
*F16B 5/08* (2006.01)
*B23K 9/007* (2006.01)
(52) U.S. Cl.
CPC ................ *F16B 5/08* (2013.01); *B23K 9/007* (2013.01)
(58) Field of Classification Search
CPC ..... Y10T 403/477; F16B 5/08; B23K 26/323; B23K 15/0073

USPC ................................................... 403/271, 272
See application file for complete search history.

(56) References Cited

U.S. PATENT DOCUMENTS

| | | | | | |
|---|---|---|---|---|---|
| 3,655,424 | A | * | 4/1972 | Orowan | F16B 5/04 |
| | | | | | 428/164 |
| 4,030,849 | A | * | 6/1977 | Keifert | B23K 9/23 |
| | | | | | 403/272 |
| 4,187,407 | A | * | 2/1980 | Marko, Jr. | F16B 5/08 |
| | | | | | 219/91.23 |
| 6,960,383 | B2 | * | 11/2005 | Heta | B29C 65/605 |
| | | | | | 403/268 |

(Continued)

FOREIGN PATENT DOCUMENTS

| | | |
|---|---|---|
| CN | 102059460 | 5/2011 |
| DE | 10 2017 219 854 | 5/2019 |

(Continued)

OTHER PUBLICATIONS

International Search Report issued Oct. 6, 2020 in International (PCT) Application No. PCT/JP2020/032641.

(Continued)

*Primary Examiner* — Amber R Anderson
*Assistant Examiner* — Zachary A Hall
(74) *Attorney, Agent, or Firm* — Wenderoth, Lind & Ponack, L.L.P.

(57) ABSTRACT

A second member has a through-portion penetrating toward a first member. An overlapped surface of the second member with the first member includes a recess. The recess is recessed so as to surround an entire periphery of the through-portion. The recess is provided with a sealing material. The sealing material closes a gap between overlapped surfaces of the first member and the second member.

11 Claims, 7 Drawing Sheets

(56) References Cited

U.S. PATENT DOCUMENTS

| | | | | |
|---|---|---|---|---|
| 7,341,394 B2* | 3/2008 | Krimm | F16H 59/10 | |
| | | | 74/473.21 | |
| 8,114,242 B2* | 2/2012 | Cai | F16B 11/006 | |
| | | | 156/310 | |
| 8,250,728 B2* | 8/2012 | Stevenson | B21J 15/36 | |
| | | | 29/525.14 | |
| 9,643,356 B2* | 5/2017 | Matsuo | F16B 19/06 | |
| 9,759,249 B2* | 9/2017 | Kurokawa | F16B 19/008 | |
| 10,035,216 B2* | 7/2018 | Wisniewski | B29C 66/472 | |
| 12,134,148 B2* | 11/2024 | Fujiwara | B23K 9/23 | |
| 2019/0101145 A1 | 4/2019 | Fujiwara et al. | | |
| 2019/0226508 A1* | 7/2019 | Kurokawa | F16B 11/006 | |
| 2019/0257333 A1 | 8/2019 | Fujiwara et al. | | |
| 2019/0368524 A1 | 12/2019 | Fujiwara et al. | | |
| 2020/0147671 A1 | 5/2020 | Iwase | | |
| 2020/0298340 A1 | 9/2020 | Fujiwara et al. | | |
| 2022/0403866 A1* | 12/2022 | Munzinger | C09J 5/00 | |

FOREIGN PATENT DOCUMENTS

| | | | | |
|---|---|---|---|---|
| EP | 3 505 289 | 7/2019 | | |
| EP | 3 563 961 | 11/2019 | | |
| JP | 2009-000728 | 1/2009 | | |
| JP | 2009-226446 | 10/2009 | | |
| JP | 2018-103241 | 7/2018 | | |
| WO | WO-2010125818 A1 * | 11/2010 | | G06K 19/07754 |
| WO | 2017/170106 | 10/2017 | | |
| WO | 2018/030272 | 2/2018 | | |
| WO | 2018/142994 | 8/2018 | | |
| WO | 2018/235753 | 12/2018 | | |

OTHER PUBLICATIONS

Extended European Search Report issued Sep. 28, 2022 in corresponding European Patent Application No. 20860160.9.
Communication pursuant to Article 94(3) EPC issued Apr. 2, 2024 in corresponding European Patent Application No. 20860160.9.

* cited by examiner

JOINT STRUCTURE

CROSS-REFERENCE TO RELATED APPLICATIONS

This is a continuation of International Application No. PCT/JP2020/032641 filed on Aug. 28, 2020, which claims priority to Japanese Patent Application No. 2019-162386 filed on Sep. 5, 2019. The entire disclosures of these applications are incorporated by reference herein.

BACKGROUND

The present invention relates to a joint structure.

WO 2018/030272 discloses a joint structure in which a first metal material and a dissimilar material that is difficult to be welded to the first metal material overlap each other, and a filler material (welding wire) is arc-welded through a through-portion of the dissimilar material.

A part of the melted filler material forms a flange so as to cover an upper outer periphery of the through-portion of the dissimilar material. Accordingly, the dissimilar material and the first metal material are fixed to each other by a compressive fixing force between the flange and the first metal material due to solidification shrinkage of the filler material onto the first metal material.

SUMMARY

However, according to the invention of WO 2018/030272, moisture may enter from outside through a gap between overlapped surfaces of the first metal material and a second metal material. Electrolytic corrosion may thus occur in an area where the first metal material and the second metal material overlap each other due to the entry of the moisture, and joint strength between the materials may decrease.

In view of the foregoing, it is an object of the present invention to reduce occurrence of electrolytic corrosion in an area where a metal material and a dissimilar material overlap each other.

An aspect of the present disclosure is directed to a joint structure including a first member made of a metal material, a second member made of a material that is difficult to be welded to the first member, and a third member made of a filler material and welded to the first member, the first member, the second member, and the third member being joined together, and provides a solution as in the following.

That is, in a first aspect of the present disclosure, the second member includes a through-portion penetrating toward the first member;

the third member is welded to the first member through the through-portion;

at least one of overlapped surfaces of the first member and the second member includes a recess formed into a space separate from the through-portion, the recess being recessed so as to surround an entire periphery of the through-portion;

the recess is formed into a space separate from a welded part that is a welding site where the first member and the third member are welded together, the recess being recessed so as to surround an entire periphery of the welded part; and the recess is provided with a sealing material for closing a gap between the overlapped surfaces of the first member and the second member.

According to the first aspect, at least one of the overlapped surfaces of the first member and the second member includes the recess. The recess is recessed so as to surround the entire periphery of the through-portion of the second member. The recess is provided with the sealing material.

Since the gap between the overlapped surfaces of the first member and the second member is closed with the sealing material in this manner, it is possible to keep moisture from entering from the outside into an area where the first member and the second member overlap each other.

This makes it possible to reduce occurrence of electrolytic corrosion in the area where the first member and the second member overlap each other around the welded part, which is a welding site where the first member and the third member are welded together, and to secure joining strength.

A second aspect is an embodiment of the first aspect. In the second aspect, at least a part of the recess is open in a direction intersecting with an overlapping direction of the first member and the second member.

According to the second aspect, the recess is open in the direction intersecting with the overlapping direction of the first member and the second member. The recess is opened by, for example, partly cutting out a side face of the second member.

This configuration enables release of the sealing material deformed by heat during welding and a gas generated by evaporation of a part of the sealing material from the recess toward the opening of the recess.

A third aspect is an embodiment of the first or second aspect. In the third aspect, at least a part of the recess is open in an overlapping direction of the first member and the second member.

According to the third aspect, the recess is open in the overlapping direction of the first member and the second member. For example, the recess is formed in the second member and is opened by shifting an edge of the first member so that the first member partially covers the recess in a plan view.

This configuration enables release of the sealing material deformed by heat during welding and a gas generated by evaporation of a part of the sealing material from the recess toward the opening of the recess.

A fourth aspect is an embodiment of any one of the first to third aspects. In the fourth aspect, at least one of the first member or the second member includes a communication portion serving as an opening that communicates with the recess, and the communication portion is formed into a space separate from the welded part.

According to the fourth aspect, at least one of the overlapped surfaces of the first member and the second member includes the communication portion. The communication portion communicates with the recess.

This configuration enables release of the sealing material deformed by heat during welding and a gas generated by evaporation of a part of the sealing material through the communication portion.

A fifth aspect is an embodiment of any one of the first to fourth aspects. In the fifth aspect, the recess is formed in the first member having a smaller plate thickness than the second member, the recess being obtained by plastically deforming the first member into a three-dimensional shape.

This configuration increases the strength of the first member having a smaller plate thickness than the second member.

According to the aspects of the present disclosure, it is possible to reduce occurrence of electrolytic corrosion in an area where a metal material and a dissimilar material overlap each other.

BRIEF DESCRIPTION OF THE DRAWINGS

FIG. 2 is a cross-sectional view taken along the arrows A-A of FIG. 1.

FIG. 4 is a cross-sectional view taken along the arrows B-B of FIG. 3.

DETAILED DESCRIPTION

Embodiments of the present invention will be described below with reference to the drawings. Note that the following description of preferred embodiments is merely an example in nature, and is not intended to limit the scope, applications, or use of the present invention.

First Embodiment

Figure 1:
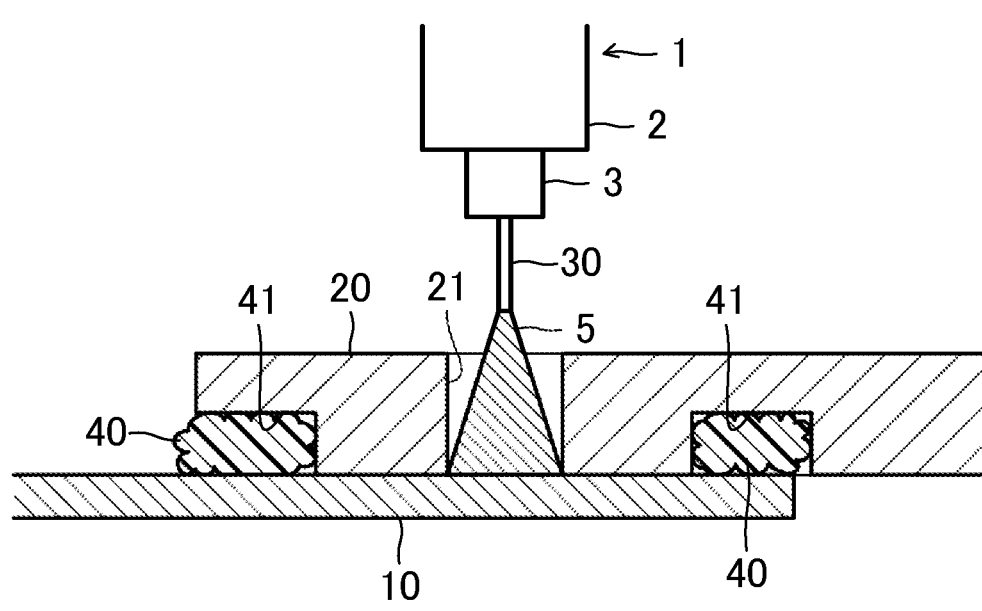
FIG. 1 is a side cross-sectional view for illustrating a joint structure according to a first embodiment.
Figure 1:
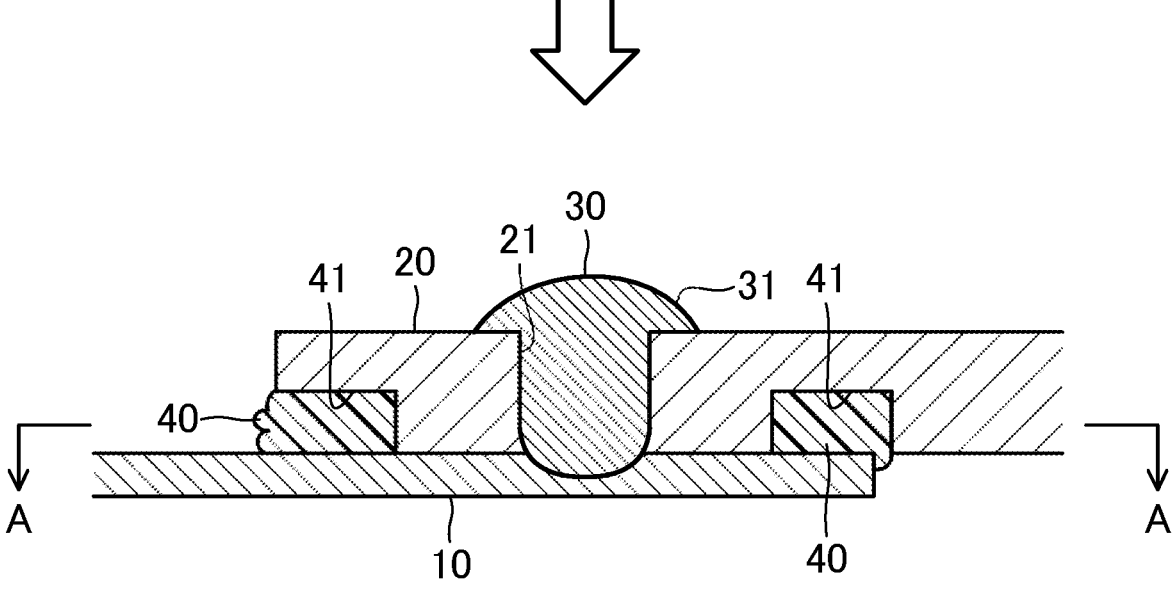

FIG. 1 shows a joint structure for joining together a first member 10 made of a metal material, a second member 20 made of a material that is difficult to be welded to the first member 10, and a third member 30 made of a filler material.

The first member 10 is a plate-shaped member made of the metal material.

The second member 20 is a plate-shaped member made of the material that is difficult to be welded to the first member 10. The second member 20 is arranged to overlap with an upper side of the first member 10. The second member 20 has a circular through-portion 21 penetrating toward the first member 10.

In the present embodiment, the through-portion 21 is described as a circular through-hole, but may be an elliptical or elongated through-hole.

The second member 20 has a recess 41. The recess 41 is formed in the overlapped surface of the second member 20 with the first member 10. The recess 41 is formed into a space separate from the through-portion 21 and is recessed so as to surround the entire periphery of the through-portion 21.

The recess 41 is formed into a space separate from a welded part that is a welding site where the first member 10 and the third member 30 are welded together. The recess 41 is recessed so as to surround the entire periphery of the welded part.

The recess 41 is provided with a sealing material 40. The sealing material 40 closes a gap between overlapped surfaces of the first member 10 and the second member 20. The sealing material 40 is, for example, a resin material or an adhesive applied to the recess 41. An O-ring, a gasket, or the like may be used as the sealing material 40 and fitted into the recess 41.

The recess 41 is open in a direction intersecting with an overlapping direction in which the first member 10 and the second member 20 overlap each other and in the overlapping direction of the first member 10 and the second member 20.

Figure 2:
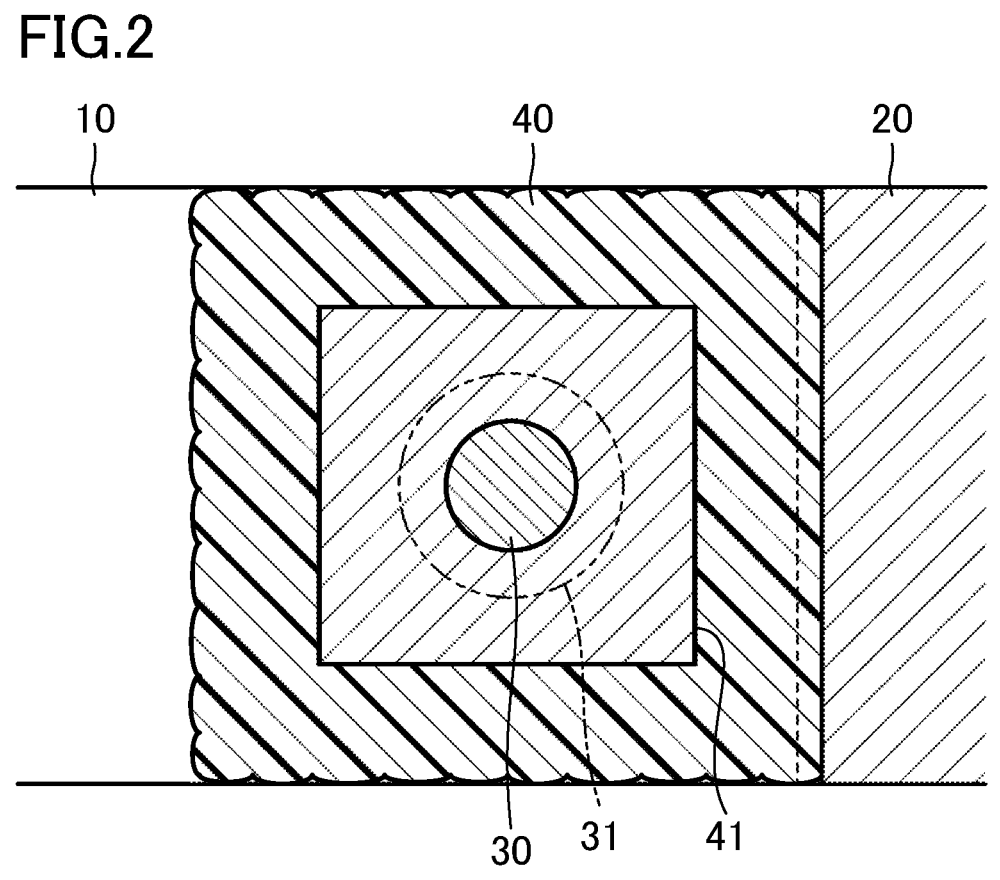

In an example shown in FIG. 2, the recess 41 is formed in a rectangular frame shape in a plan view. The second member 20 is partly cut out in three side faces (i.e., upper, lower, and left side faces of the second member 20). Thus, the recess 41 is open in directions (upward, downward, and leftward in FIG. 2) intersecting with the overlapping direction of the first member 10 and the second member 20.

A right edge of the first member 10 is shifted so that the first member 10 partially covers the recess 41 in a plan view. Thus, the recess 41 on the right side in FIG. 1 is open in the overlapping direction (downward in FIG. 1) of the first member 10 and the second member 20.

The third member 30 is made of a filler material that is a metal material of the same type as the metal material for the first member 10. The metal materials of the same type as used herein are metals that can be welded to each other, and are not only metal materials of an identical quality but also metal materials satisfactorily weldable to each other, such as ferrous metal materials or nonferrous metal materials. In other words, the metal materials of the same type are materials of the same type that are compatible with each other in welding.

Specifically, examples of a combination of the first member 10 and the third member 30 for welding include the following. For example, combinations of ferrous metal materials include mild steel and mild steel, stainless steel and stainless steel, mild steel and high-tensile steel, high-tensile steel and high-tensile steel, etc. Examples of combinations of nonferrous metal materials include aluminum and aluminum, aluminum and aluminum alloy, aluminum alloy and aluminum alloy, etc.

The second member 20 as a dissimilar material is a material of different quality from the quality of the first member 10 and the third member 30 as metal materials of the same type, and is difficult to be welded to the first member 10 and the third member 30.

For example, when the first member 10 and the third member 30 as metal materials of the same type are ferrous metal materials, the second member 20 as a dissimilar material is a nonferrous metal material such as a copper material or an aluminum material. For example, resin materials such as carbon fiber reinforced plastics (CFRP), polyethylene terephthalate (PET), and engineering plastics are also included as dissimilar materials from the metal materials.

In the following description, a mild steel material is used as the first member 10; an aluminum material is used as the second member 20; and a mild steel material is used as the third member 30 that is a filler material.

An arc welding machine 1 includes a nozzle 2 and a tip 3. The nozzle 2 supplies a shielding gas or the like to a welding site of a welding target. The tip 3 supplies a welding current to the third member 30.

The arc welding machine 1 supplies a welding current while feeding the third member 30 into the through-portion 21 of the second member 20, thereby generating an arc 5 between the third member 30 and the first member 10. The third member 30 melted by the arc welding is melt-bonded to the first member 10 and is laminated in the through-portion 21. Then, the melted third member 30 fills the through-portion 21 up, flows out to an upper peripheral edge of the through-portion 21, and spreads in a flange shape.

In a process in which the melted third member 30 becomes a bead, the third member 30 is provided with a flange 31 that presses the peripheral edge of the through-portion 21 of the second member 20. The flange 31 projects radially outward from the through-portion 21 on a surface (an upper surface in FIG. 1) of the second member 20 facing opposite to the first member 10.

The sealing material 40 is deformed by heat during welding. A part of the sealing material 40 is evaporated by the heat during welding and changes into a gas. As described above, the recess 41 is open in the direction intersecting with the overlapping direction of the first member 10 and the second member 20 and in the overlapping direction of the first member 10 and the second member 20. This configuration allows the sealing material 40 that deforms and flows in the recess 41 and the gas generated in the recess 41 to be released from the recess 41 toward the openings of the recess. This configuration also allows the gas to be released at least toward the opening of the recess in the plate thickness direction.

Thereafter, the third member 30 is solidified and contracted on the first member 10, whereby the second member 20, which is a dissimilar material, is compressed and fixed between the flange 31 and the first member 10.

The recess 41 is formed into a space separate from the welded part, which is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. The first member 10 and the third member 30 are welded together in this state, thereby making it possible to avoid entry of the moisture from the outer periphery.

As described above, according to the joint structure of the present embodiment, the gap between the overlapped surfaces of the first member 10 and the second member 20 is closed with the sealing material 40. It is therefore possible to keep moisture from entering from the outside into an area where the first member 10 and the second member 20 overlap each other.

This makes it possible to reduce occurrence of electrolytic corrosion in the area where the first member and the second member overlap each other around the welded part, which is a welding site where the first member and the third member are welded together, and to secure joining strength.

Second Embodiment

In the following description, the same reference characters designate the same components as those of the first embodiment, and the description is focused only on differences between this embodiment and the first embodiment.

Figure 3:
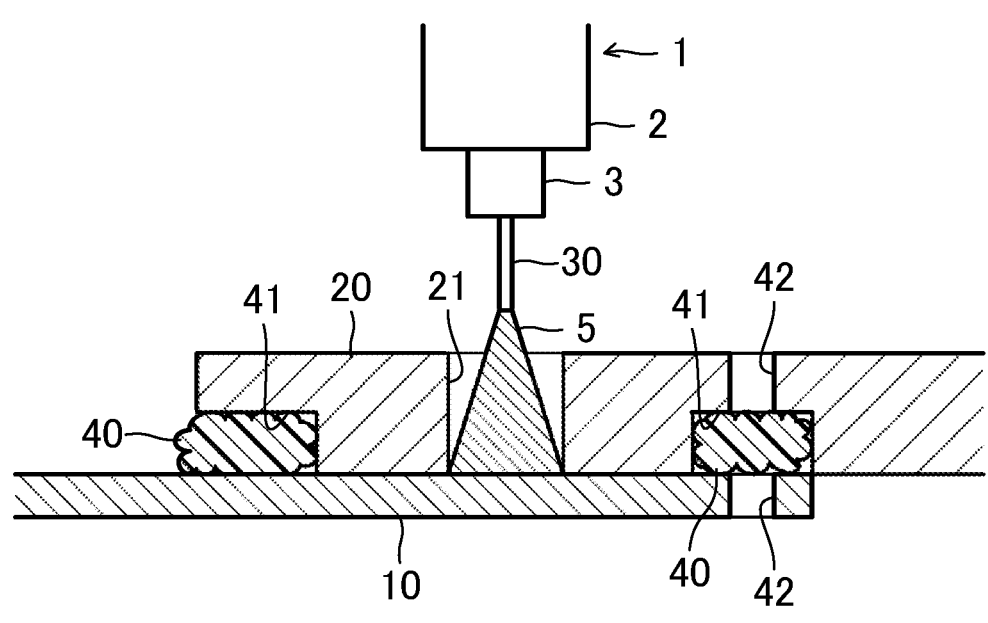
FIG. 3 is a side cross-sectional view for illustrating a joint structure according to a second embodiment.
Figure 3:
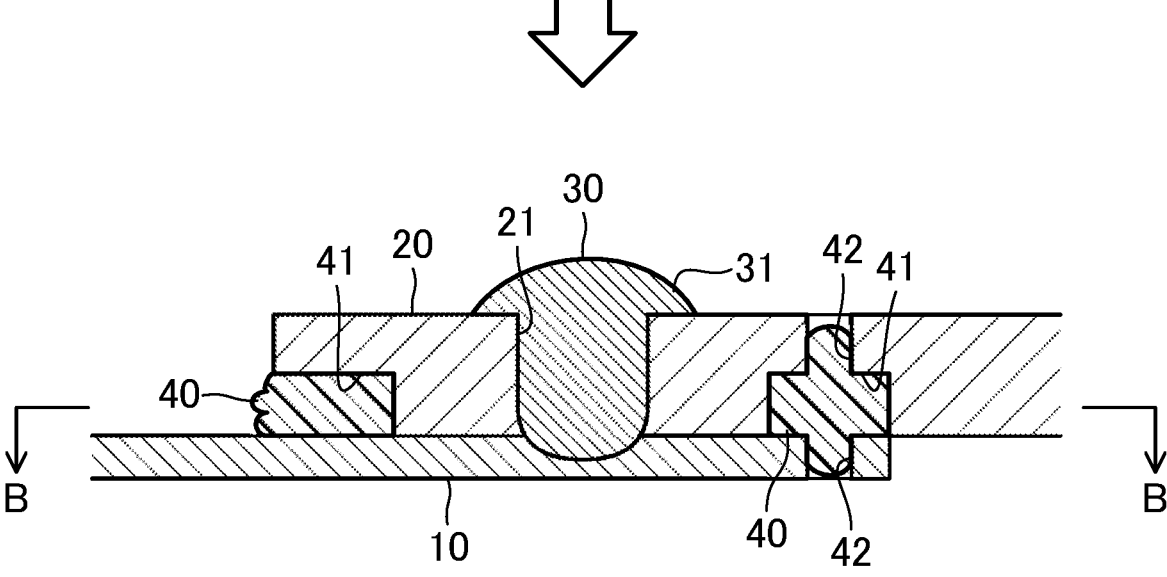

As shown in FIG. 3, a second member 20 has a recess 41. The recess 41 is formed in the overlapped surface of the second member 20 with the first member 10. The recess 41 is formed into a space separate from the through-portion 21 and is recessed so as to surround the entire periphery of the through-portion 21. The recess 41 is formed into a space separate from a welded part that is a welding site where the first member 10 and the third member 30 are welded together. The recess 41 is recessed so as to surround the entire periphery of the welded part.

The recess 41 is provided with a sealing material 40. The sealing material 40 closes a gap between overlapped surfaces of the first member 10 and the second member 20.

Figure 4:
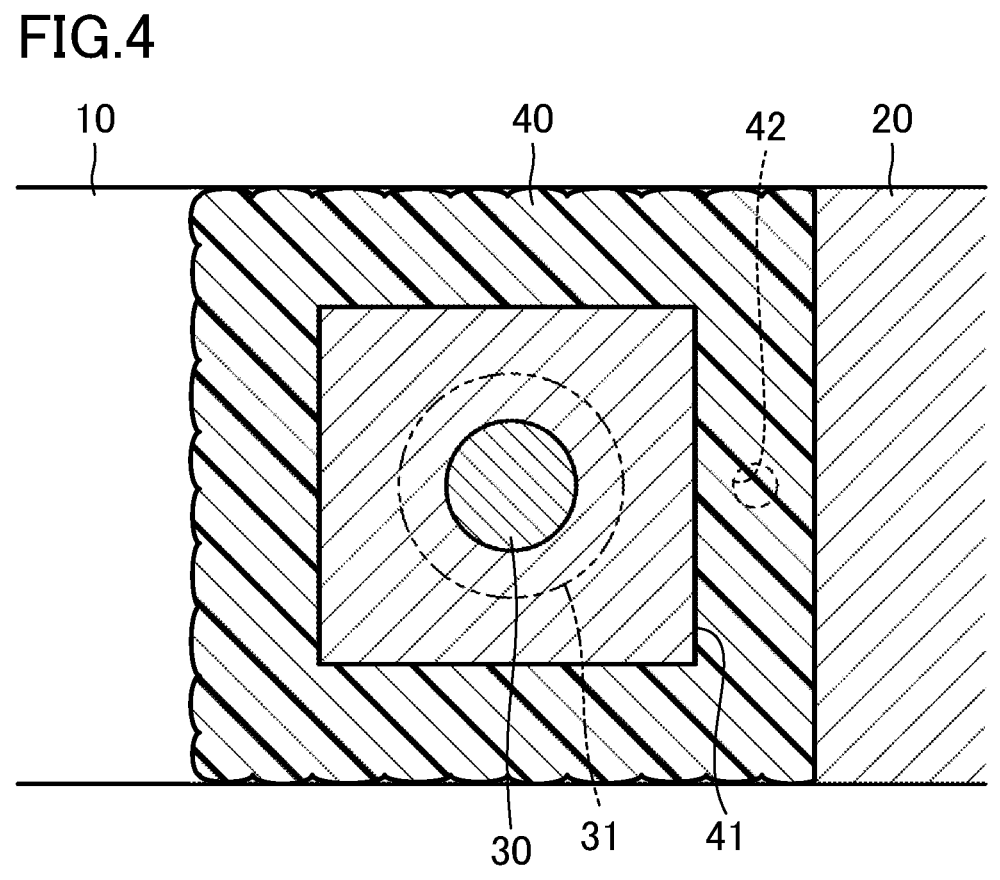

In an example shown in FIG. 4, the recess 41 is formed in a rectangular frame shape in a plan view. As side faces of the second member 20 are partly cut out, the recess 41 is open in directions (upward, downward, and leftward in FIG. 4) intersecting with the overlapping direction of the first member 10 and the second member 20.

The first member 10 is disposed so as to close a lower opening of the recess 41 on the right side in FIG. 3. The first member 10 and the second member 20 have a communication portion 42 that is an opening. The communication portion 42 communicates with the recess 41 on the right side in FIG. 3.

The communication portion 42 is formed into a space separate from the welded part that is a welding site where the first member 10 and the third member 30 are welded together.

As shown in FIG. 4, the communication portion 42 is formed as a circular communication hole. The first member 10 and the second member 20 each have one communication portion 42. A plurality of the communication portions 42 may be provided at intervals along the recess 41 in plan view.

When the third member 30 is welded to the first member 10 by the arc welding machine 1, the sealing material 40 is deformed by heat during welding. A part of the sealing material 40 is evaporated by the heat during welding and changes into a gas.

In an example shown in FIG. 3, as the side faces of the second member 20 are partly cut out, the recess 41 is open in a direction (leftward in FIG. 3) intersecting with the overlapping direction of the first member 10 and the second member 20. The recess 41 is open in the overlapping direction (upward and downward in FIG. 3), as well, which is a plate thickness direction of the first member 10 and the second member 20, due to the communication portion 42. The communication portion 42 is formed into a space separate from the welded part, which is a welding site where the first member 10 and the third member 30 are welded together.

This configuration allows the sealing material 40 that deforms and flows in the recess 41 and the gas generated in the recess 41 to be released from the recess 41 toward the openings of the recess 41 and also to be released from at least the communication portion 42 serving as the opening in the overlapping direction, which is the plate thickness direction.

Third Embodiment

Figure 5:
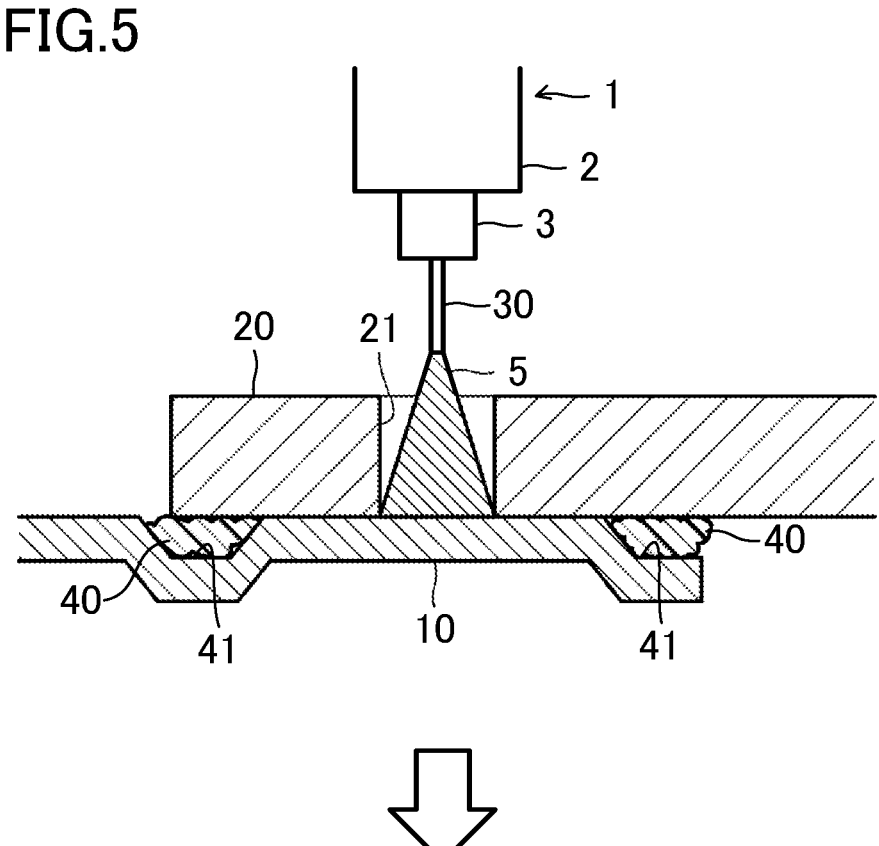
FIG. 5 is a side cross-sectional view for illustrating a joint structure according to a third embodiment.
Figure 5:
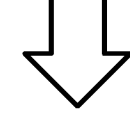
Figure 5:
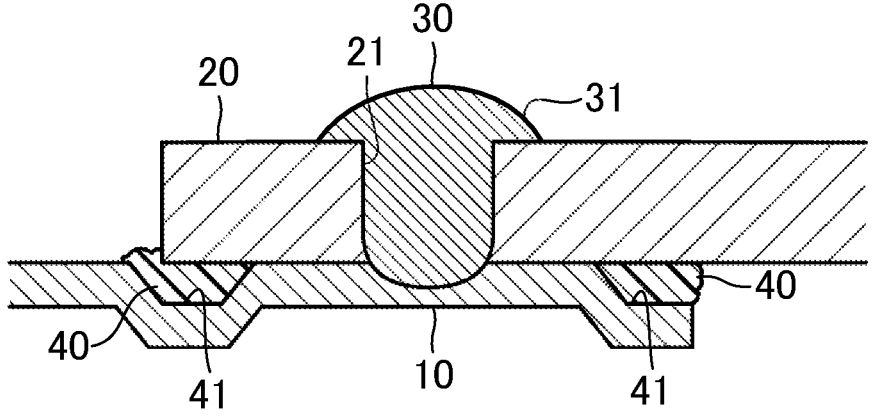

As shown in FIG. 5, a first member 10 has a recess 41. The recess 41 is formed in the overlapped surface of the first member 10 with a second member 20. The recess 41 is formed by press-forming the first member 10 having a smaller plate thickness than the second member 20 to be plastically deformed into a three-dimensional shape. The recess 41 is recessed downward in a stepped shape. The recess 41 is formed into a space separate from the through-portion 21 and is recessed so as to surround the entire periphery of the through-portion 21.

The recess 41 is provided with a sealing material 40. The sealing material 40 closes a gap between overlapped surfaces of the first member 10 and the second member 20.

The recess 41 is open in a direction intersecting with an overlapping direction in which the first member 10 and the second member 20 overlap each other and in the overlapping direction of the first member 10 and the second member 20.

The recess 41 on the right side in FIG. 5 is open in a direction (rightward in FIG. 5) intersecting with the overlapping direction of the first member 10 and the second member 20.

A left edge of the second member 20 is shifted so that the second member 20 partly covers the recess 41 in a plan view. Thus, the recess 41 on the left side in FIG. 5 is open in the overlapping direction (upward in FIG. 5) of the first member 10 and the second member 20.

The strength of the first member 10, which has a smaller plate thickness than the second member 20, is increased by the recess 41 obtained by press-forming, and plastically deforming into a three-dimensional shape, the first member 10 thinner than the second member 20.

The recess 41 is formed into a space separate from a welded part that is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. The first member 10 and the third member 30 are welded together in this state, thereby making it possible to avoid entry of the moisture from the outer periphery.

Even when the sealing material 40 is deformed in the recess 41 or a gas is generated in the recess 41 due to heat during welding, this joint structure allows the flowing sealing material 40 or the flowing gas to be released from the recess 41 toward the openings of the recess 41. This configuration also allows the gas to be released at least toward the opening of the recess in the plate thickness direction.

Fourth Embodiment

Figure 6:
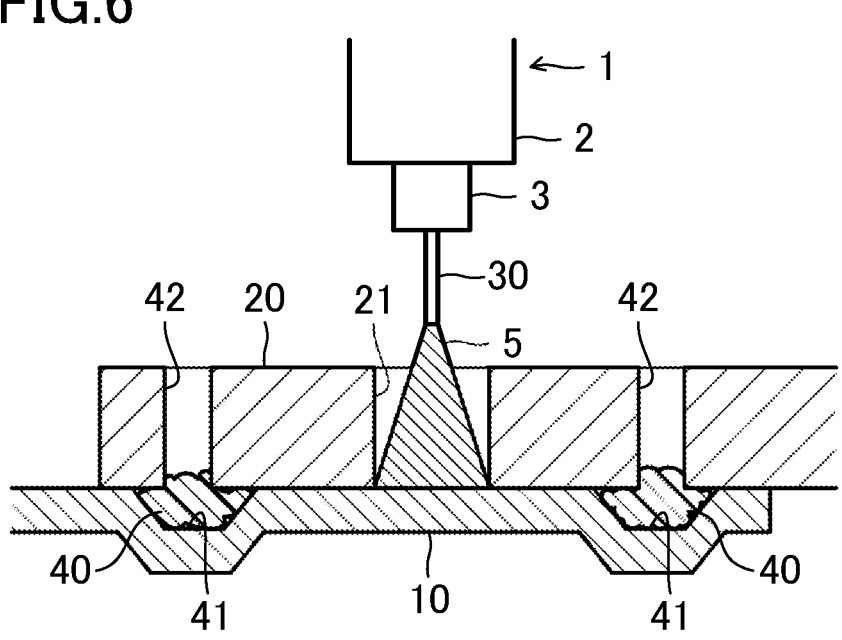
FIG. 6 is a side cross-sectional view for illustrating a joint structure according to a fourth embodiment.
Figure 6:
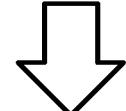
Figure 6:
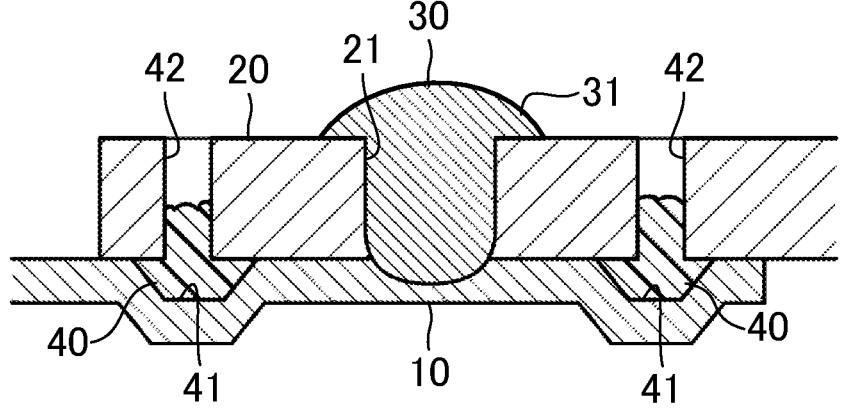

As shown in FIG. 6, a first member 10 has a recess 41. The recess 41 is formed in the overlapped surface of the first member 10 with a second member 20. The recess 41 is formed by press-forming the first member 10 having a smaller plate thickness than the second member 20 to be plastically deformed into a three-dimensional shape. The recess 41 is recessed downward in a stepped shape. The recess 41 is formed into a space separate from the through-portion 21 and is recessed so as to surround the entire periphery of the through-portion 21.

The second member 20 is disposed so as to close an upper opening of the recess 41. The second member 20 has a communication portion 42 serving as an opening. The communication portion 42 is formed into a space separate from the welded part that is a welding site where the first member 10 and the third member 30 are welded together. The communication portion 42 communicates with the recess 41. In an example shown in FIG. 6, the communication portions 42 are provided at positions communicating with right and left portions of the recess 41. However, the number and positions of the communication portions 42 may be set freely.

The strength of the first member 10, which has a smaller plate thickness than the second member 20, is increased by the recess 41 obtained by press-forming, and plastically deforming into a three-dimensional shape, the first member 10 thinner than the second member 20.

The recess 41 is formed into a space separate from a welded part that is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. The first member 10 and the third member 30 are welded together in this state, thereby making it possible to avoid entry of the moisture from the outer periphery.

Even when the sealing material 40 is deformed in the recess 41 or a gas is generated in the recess 41 due to heat during welding, this joint structure allows the flowing sealing material 40 and the flowing gas to be released at least from the communication portions 42, which are openings in the plate thickness direction.

Fifth Embodiment

Figure 7:
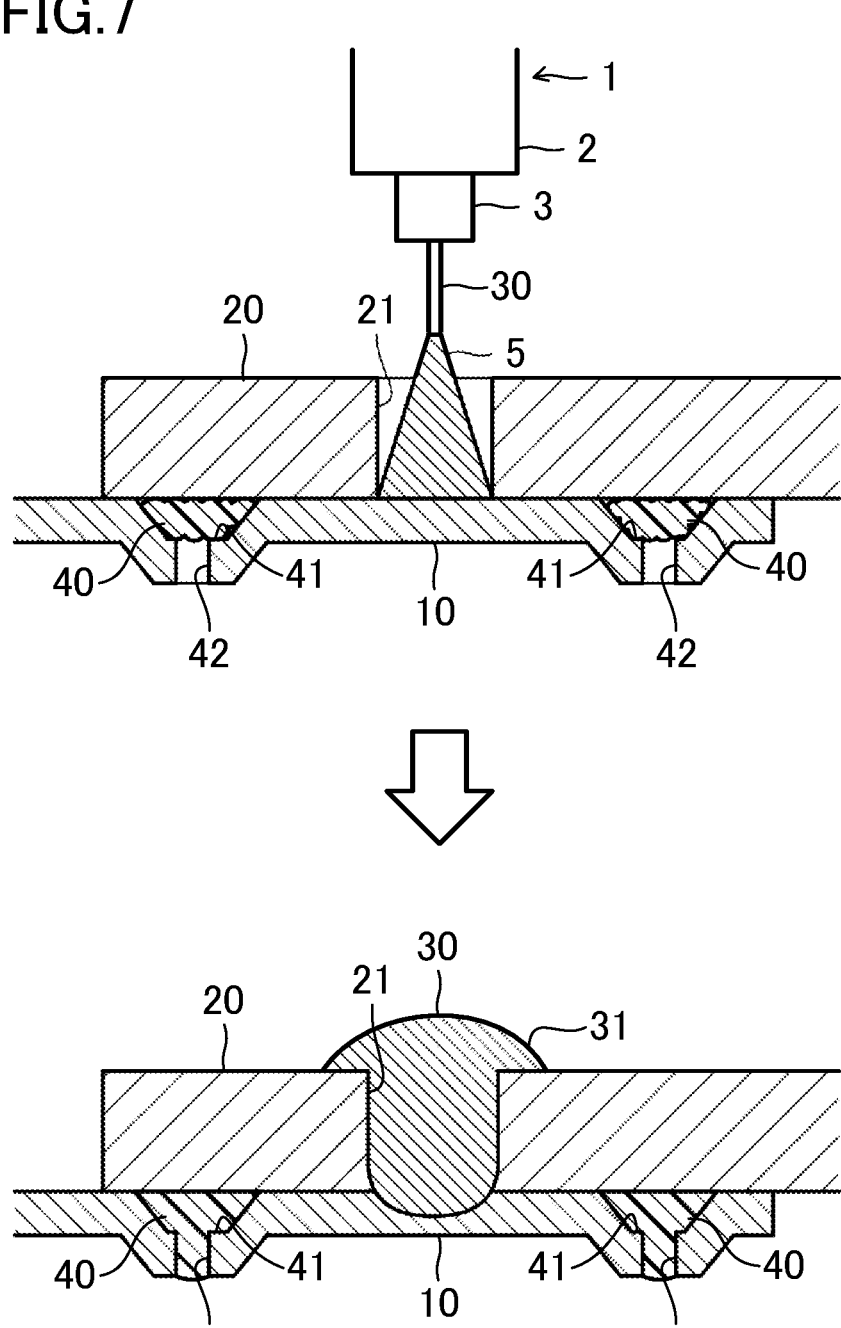
FIG. 7 is a side cross-sectional view for illustrating a joint structure according to a fifth embodiment.

As shown in FIG. 7, a first member 10 has a recess 41. The recess 41 is formed in the overlapped surface of the first member 10 with a second member 20. The recess 41 is formed by press-forming the first member 10 having a smaller plate thickness than the second member 20 to be plastically deformed into a three-dimensional shape. The recess 41 is recessed downward in a stepped shape. The recess 41 is formed into a space separate from the through-portion 21 and is recessed so as to surround the entire periphery of the through-portion 21. The recess 41 is formed into a space separate from a welded part that is a welding site where the first member 10 and the third member 30 are welded together. The recess 41 is recessed so as to surround the entire periphery of the welded part. The second member 20 is disposed so as to close an upper opening of the recess 41.

The first member 10 has a communication portion 42 serving as an opening. The communication portion 42 is formed into a space separate from the welded part that is a welding site where the first member 10 and the third member 30 are welded together. The communication portion 42 communicates with the recess 41. In an example shown in FIG. 7, the communication portions 42 are provided at positions communicating with right and left portions of the recess 41. However, the number and positions of the communication portions 42 may be set freely.

The strength of the first member 10, which has a smaller plate thickness than the second member 20, is increased by the recess 41 obtained by press-forming, and plastically deforming into a three-dimensional shape, the first member 10 thinner than the second member 20.

The recess 41 is formed into a space separate from a welded part that is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. The first member 10 and the third member 30 are welded together in this state, thereby making it possible to avoid entry of the moisture from the outer periphery.

Even when the sealing material 40 is deformed in the recess 41 or a gas is generated in the recess 41 due to heat during welding, this joint structure allows the flowing sealing material 40 and the flowing gas to be released at least from the communication portions 42, which are openings in the plate thickness direction.

Other Embodiments

The embodiments described above may be modified as follows.

In the present embodiments, arc welding is performed on the recess 41 in the first member 10. However, for example, so-called laser filler welding may be performed in which laser welding is performed using a filler wire as a filler material.

In the present embodiments, the recess 41 is formed in the first member 10 or the second member 20, but the recess 41 may be formed in each of the first member 10 and the second member 20.

As can be seen from the foregoing description, the present invention can produce a highly practical effect of being able to reduce occurrence of electrolytic corrosion in an area where a metal material and a dissimilar material overlap each other, and is therefore very useful and offers high industrial applicability.

What is claimed is:

1. A joint structure including a first member made of a metal material, a second member made of a material that is difficult to weld to the first member, and a third member made of a filler material and welded to the first member, the first member, the second member, and the third member being joined together, the second member including a through-portion penetrating toward the first member, the third member being arc welded to the first member through the through-portion, wherein a surface of the first member and a surface of the second member directly overlap each other in an overlapping direction, the third member being melted so as to form a flange at a peripheral edge of the through-portion on a surface of the second member which is opposite to the surface of the second member that directly overlaps the surface of the first member, at least one of the overlapped surfaces of the first member and the second member including a recess formed into a space separate from the through-portion, the recess being recessed so as to surround an entire periphery of the through-portion, the recess being provided with a sealing material for closing a gap between the overlapped surfaces of the first member and the second member, the recess being formed into a space separate from a welded part that is a welding site where the first member and the third member are welded together to avoid contact between the third member and the sealing material, the recess being recessed so as to surround an entire periphery of the welded part, at least a part of the recess is open so as to face in a direction which intersects with the overlapping direction of the first member and the second member, and a size of an open side of the recess is different on opposite ends of the recess.

2. The joint structure of claim 1, wherein at least a part of the recess is open in the overlapping direction of the first member and the second member.

3. The joint structure of claim 2, wherein the first member includes an edge corresponding to a line of the first member in a plan view in the overlapping direction of the first member and the second member, and the edge of the first member is shifted so that the first member partially covers the recess.

4. The joint structure of claim 3, wherein an open side of the recess which is open in the overlapping direction of the first member and the second member extends corresponding to the edge of the first member, and the open side of the recess which extends corresponding to the edge of the first member has a size corresponding to a distance from the edge of the first member.

5. The joint structure of claim 4, wherein the second member includes an edge corresponding to a line of the second member in the plan view in the overlapping direction of the first member and the second member and a side surface which is cut out partly, an open side of the recess which is open in the direction intersecting with the overlapping direction of the first member and the second member extends corresponding to the edge of the second member, and the open side of the recess which extends corresponding to the edge of the second member has a size corresponding to a thickness of a part which is cut out from the second member.

6. The joint structure of claim 1, wherein at least one of the first member or the second member includes a communication portion serving as an opening that communicates with the recess, and the communication portion is formed into a space separate from the welded part.

7. The joint structure of claim 1, wherein the recess is formed in the first member having a smaller plate thickness than the second member, the recess being obtained by plastically deforming the first member into a three dimensional shape.

8. The joint structure of claim 1, wherein the recess and the sealing material are isolated from the welding site where the first member and the third member are welded together.

9. The joint structure of claim 1, wherein a combination of the first member and the third member includes one of aluminum and aluminum, aluminum and aluminum alloy, and aluminum alloy and aluminum alloy.

10. The joint structure of claim 1, wherein the first member has a smaller plate thickness than the second member.

11. The joint structure of claim 1, wherein in a side cross-sectional view, the first member and the second member each have an end, and a surface portion which extends in a longitudinal direction from the end, and wherein the recess portion, in the side cross-sectional view, is located between the surface portion of the second member and the end of the first member, as well as between the surface portion of the first member and the end of the second member.

\* \* \* \* \*